No. 859,169. PATENTED JULY 2, 1907.
L. CSÁKA.
REVERSIBLE ROTARY ENGINE.
APPLICATION FILED FEB. 15, 1907.
Fig. 1
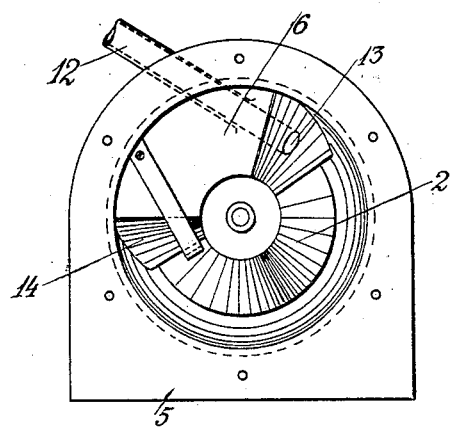
Fig. 2
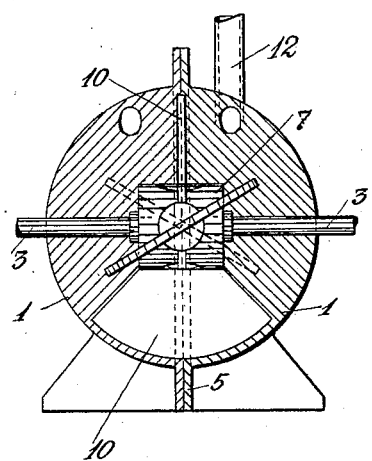
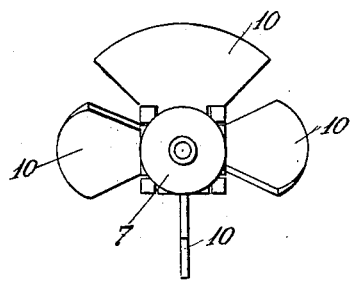
Fig. 3
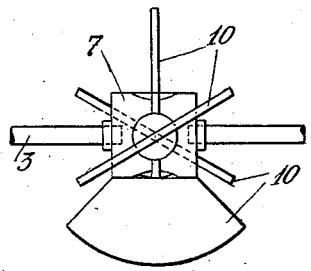
Fig. 4
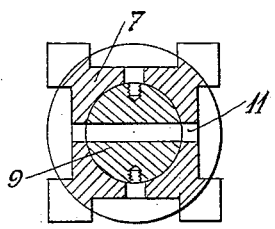
Fig. 5
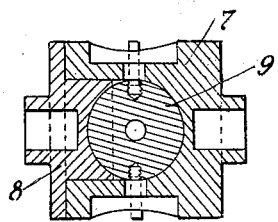
Fig. 6
Witnesses:
Inventor:
Ladislaus Csáka

UNITED STATES PATENT OFFICE.

LADISLAUS CSÁKA, OF FIUME, AUSTRIA-HUNGARY.

REVERSIBLE ROTARY ENGINE.

No. 859,169.  Specification of Letters Patent.  Patented July 2, 1907.

Application filed February 15, 1907. Serial No. 357,549.

*To all whom it may concern:*

Be it known that I, LADISLAUS CSÁKA, a subject of the Kingdom of Hungary, and resident of Fiume, Austria-Hungary, have invented new and useful Improvements in and relating to Reversible Rotary Engines, of which the following is a specification.

The object of the present invention relates to a reversible rotary engine which surpasses the known engines of its kind by the fact that only the steam inlet is to be changed when the reversing of the motion is desired.

In the accompanying drawing, a sample form is shown how the invention is put into practice, it shows: Figure 1 a view into the interior of an engine casing half. Fig. 2 a vertical section of the engine, the axle and wings being in view, and Figs. 3 to 6 show details.

The engine as hereinafter described, consists of two equal hemispherical parts 1, of the shape as shown in Fig. 1. Each part is provided with a projection 2, on which the wing-axle 3 respectively the bearing 7 is mounted. The prolongation is as seen in the drawing, of an obtuse angled conical shape and points into the interior of the casing. Both the parts 1 are united by means of screws, or bolts, or any other suitable means which are led through flanges 5 provided on both parts 1. Each part is provided in its interior with an extension 6 which faces partly the wall of the casing and partly the projection 2 and the upper surface of said extension 6 is situated below the edge of the part 1, the difference between the level of said surface of the extension and the edge of the part, being equal to half the thickness of a shovel employed with the engine. This part of the extension 6 which is situated towards the center of the casing is cylindrically hollowed out and destined to receive the wing axle. The ends of the extension 6 are beveled and serve as abutments for the wings.

When fitting an engine according to the invention, it is to be observed that first the axle is placed into one part 1, whereafter the second part is pushed over the extending part of said axle. The axle 3 is furnished with a cylindrical bearing 7 and provided with packing ribs, said bearing 7 destined to receive the wings.

The bearing 7 is provided with a chamber into which a ball 9 is inserted, which is kept in position by the lid 8. Two of the opposite situated wings 10 of the shape as shown in Fig. 3, top part, are rotatably attached to each other by means of a rod which is led through the bore 11 of the bearing 7 and the bore of the ball 9. The other two wings however are attached to each other by the ball 9.

Each of the parts 1 is provided with a steam inlet nozzle 12 which leads at 13, into the interior of the casing, traversing the extension 6.

When an engine is fitted, the wings may occupy a position as shown in Fig. 2.

The operation of the turbine is as follows: The steam enters the casing through the inlet nozzle 12 and exercises its power to the wings 10 situated in front of the inlet 13, and consequently the axle 3 and the other wings revolve. At the same time said wing 10 moves to and fro axially round its one axis due to the fact that said wing comes into contact with the abutments provided by the extension 6. The wing 10 which is at first influenced by the entering steam is forced forwards, until it comes into contact with the beveled abutment 14 of the extension 6. Arrived in this position the wing successively takes up the vertical as shown in Fig. 2, top wing, and comes again in front of the steam inlet 13, guided by the extension 6. The steam exhausts through the second half of the casing. Now, upon the motion of the engine being reversed, the steam supply has to enter through the exhaust, whereupon the whole effect is repeated as described above.

Two diametrical situated wings revolve around their own diametral line in equal proportions.

It is obvious that the described engine can also be driven by any liquid.

Having fully described my invention, what I claim and desire to secure by Letters Patent is:

A reversible rotary engine, comprising in combination, two equal hemispherical casing halves (1) each provided with a steam inlet (12), extensions (6) with beveled ends, and situated in the interior of the casing halves, a wing axle (3) furnished with segmental wings and mounted in the bearing (7), and each two opposite situated wings revolving around their own axis, said movement caused by the influence of the extension (6) and the driving medium, substantially as described and shown and for the purpose set forth.

In testimony whereof I have hereunto set my hand, in the presence of two subscribing witnesses.

LADISLAUS CSÁKA.

Witnesses:
EMILIA VERMES,
FRANZ HERRING.